(12) United States Patent
Li et al.

(10) Patent No.: US 7,512,212 B2
(45) Date of Patent: Mar. 31, 2009

(54) MULTI-ARRAY DETECTOR MODULE STRUCTURE FOR RADIATION IMAGING

(75) Inventors: Yuanjing Li, Beijing (CN); Shuwei Li, Beijing (CN); Qingjun Zhang, Beijing (CN); Qingwen Miao, Beijing (CN); Zhude Dai, Beijing (CN); Nianming Jiang, Beijing (CN); Yongqiang Wang, Beijing (CN)

(73) Assignees: Tsinghua University (CN); Nuctech Company Limited (CN)

( * ) Notice: Subject to any disclaimer, the term of this patent is extended or adjusted under 35 U.S.C. 154(b) by 132 days.

(21) Appl. No.: 11/641,592

(22) Filed: Dec. 19, 2006

(65) Prior Publication Data

US 2007/0172027 A1      Jul. 26, 2007

(30) Foreign Application Priority Data

Dec. 31, 2005    (CN) .................... 2005 1 0136318

(51) Int. Cl.
G01N 23/083    (2006.01)
H05G 1/64      (2006.01)
G01T 1/00      (2006.01)

(52) U.S. Cl. .................... 378/51; 378/57; 378/98.8; 250/370.09

(58) Field of Classification Search ............ 378/19, 378/98.8, 51, 57; 250/370.08, 370.09, 370.1, 250/363.03, 363.04, 363.05
See application file for complete search history.

(56) References Cited

U.S. PATENT DOCUMENTS 6,586,744 B1 * 7/2003 Griesmer et al. ....... 250/370.15
6,864,484 B1 * 3/2005 Zur .................. 250/370.09
7,217,931 B2 * 5/2007 Ueno et al. ............ 250/370.09
7,297,955 B2 * 11/2007 Amemiya et al. ...... 250/363.05
7,429,738 B2 * 9/2008 Li et al. ................ 250/370.09
2006/0273259 A1 * 12/2006 Li et al. ..................... 250/394
2007/0096030 A1 * 5/2007 Li et al. ................ 250/370.09

* cited by examiner

Primary Examiner—Allen C. Ho
(74) Attorney, Agent, or Firm—Schwegman, Lundberg & Woessner, P.A.

(57) ABSTRACT

Disclosed is a multi-array detector module structure pertaining to the technical field of radiation detecting. The multi-array detector module structure comprises a casing, a bottom plate to which a bottom end of the casing is fixedly connected, and a multi-array detector composed of a plurality of detectors, wherein a mounting frame is disposed on the bottom plate, and the mounting frame includes an upper plate and a lower plate. The multi-array detector comprises two rows of peripheral detector arrays fixed to the upper plate and the lower plate of the mounting frame, respectively, and at least one row of middle detector array disposed between the two rows of peripheral detector arrays and fixed to the same. Heavy metal sheets are provided between respective detector arrays in respective rows of detector arrays, for reducing cross talk. Furthermore, heavy metal plates are provided between the two rows of peripheral detector arrays and the upper plate and the lower plate of the mounting frame, respectively, for reducing diffusion. Compared with the prior art, the present invention can achieve remarkable economic benefit by slightly improving the structure with low investment. The present invention further has advantages of a simple structure and convenience in installation and maintenance.

17 Claims, 2 Drawing Sheets

MULTI-ARRAY DETECTOR MODULE STRUCTURE FOR RADIATION IMAGING

RELATED APPLICATION

This application claims priority under 35 U.S.C. 119 from Chinese Application No. 200510136318.3 filed 31 Dec. 2005, which application is incorporated herein by reference.

FIELD OF THE INVENTION

The present invention relates to a detector array module structure used in a radiation imaging system and a radiation imaging system having the same, and pertains to a technical field of radiation detecting.

DESCRIPTION OF THE RELATED ART

In the prior art, a detector array used in radiation imaging is usually arranged in a single row. Thus, manufacturing processes of a single array of detector module and image reconstruction are relatively simple. However, in a radiation system with pulse X-rays generated by an electron accelerator being used as a radiation source, in order to prevent image distortion and information loss of an object to be detected, the following conditions should be generally satisfied: a maximum speed for scanning the object to be detected should be in direct proportion to repetition frequency of the accelerator and to widths of sensitive regions of a detector array.

In practice, improvement of the repetition frequency of the accelerator is limited, because such improvement is difficult to be technically implemented. Further, intensity of the radiation field of the whole radiation imaging system is caused to increase, so that it is difficult to implement desirable radiation protection, and power consumption of the whole radiation imaging system will be considerably increased. Also, radiation field efficiency of existing single-array detector is low. Whether a radiation field of an accelerator or a radiation field of isotope radiation source is used, X-ray region containing usable information of an object to be detected is considerably larger than width of a sensitive region of the detector array. If width of each sensitive region of the detector in the single-array detector is increased, a size of each of the pixels of the detector will be increased, which in turn disadvantageously influences discrimination of fine substances, such as metal wire, by the radiation imaging system. Thus, there is a great possibility of reducing structural information of the object to be detected, thereby degrading imaging quality.

SUMMARY OF THE INVENTION

The invention aims to solve at least one aspect of the above technical problems existing in the prior art.

Accordingly, an object of the invention is to provide a multi-array detector module structure for radiation imaging, which enables a scanning speed of a radiation imaging system to be improved, and can prevent image distortion and information loss of an object to be detected, and further can ensure image quality.

The above object is achieved by providing a multi-array detector module structure, comprising:

a casing; a bottom plate to which a bottom end of the casing is fixedly connected, and a multi-array detector composed of a plurality of detectors, wherein a mounting frame is disposed on the bottom plate, and the mounting frame includes an upper plate and a lower plate, the multi-array detector comprises:

two rows of peripheral detector arrays fixed to the upper plate and the lower plate of the mounting frame, respectively;

at least one row of middle detector array disposed between the two rows of peripheral detector arrays and fixed to the same; and heavy metal sheets provided between respective detector arrays in respective rows of detector arrays, for reducing cross talk.

Preferably, heavy metal plates are provided between the two rows of peripheral detector arrays and the upper plate and the lower plate of the mounting frame, respectively, for reducing diffusion.

Preferably, inside of the casing is provided a bracket to which a plurality of circuit boards are fixed, wherein input terminals of the plurality of circuit boards are connected with output terminals of the plurality of detector arrays, respectively.

Preferably, the casing is provided on an end face thereof with a plurality of sockets connected with output terminals of the plurality of circuit boards, respectively.

Preferably, the casing has a ⊔ shape.

Preferably, the upper plate and the lower plate are printed circuit boards.

Preferably, the at least one row of middle detector array includes one row of middle detector array.

Preferably, the at least one row of middle detector array includes two rows of or more than two rows of middle detector arrays.

Preferably, the casing is provided on at least one end face thereof with a detachable covering plate, and the shape of the covering plate matches that of the casing so as to facilitate mounting/dismounting of components in the casing.

Preferably, the detector employs a gas detector or a solid detector.

Preferably, the heavy metal plate is made of lead metal.

According to another aspect of the present invention, a radiation imaging system is provided, comprising a radiation source disposed on a side of the object to be detected, and a detector device disposed on an opposite side of the object to be detected to the radiation source, and the detector device comprises a plurality of multi-array detector module structures for radiation imaging according to the first aspect of the present invention.

Preferably, the plurality of multi-array detector module structures are arranged into a sector shape or a L shape.

Preferably, the radiation source is a X-ray radiation source or an isotope radiation source.

In the above module structure, the casing is provided on the upper end face and the rear end face thereof with an upper covering plate and a rear covering plate, respectively, which have shapes matching the upper end face and the rear end face, respectively, so as to facilitate mounting/dismounting of components in the casing.

With the radiation imaging system according to the present invention in which a plurality of detector array rows are used, scanning speed of the system can be improved, and at the same time structural information of the object to be detected can be prevented from being lost, or image distortion can be prevented. Furthermore, since heavy metal sheets and heavy metal plates, such as lead plates, are provided between respective rows of detector arrays and between respective detectors in respective rows of detector arrays, adverse influence of diffusion and cross talk to image quality can be reduced, so that imaging quality can be considerably improved. Compared with the prior art, the present invention can achieve remarkable economic benefit by slightly improving the structure with low investment. The present invention further has advantages of a simple structure and convenience in installation and maintenance.

BRIEF DESCRIPTION OF THE DRAWINGS

Hereafter, the present invention is explained in details by taking an embodiment as an example in conjunction with the drawings, in which.

DETAILED DESCRIPTION OF THE PREFERRED EMBODIMENT

Hereafter, a preferred embodiment of the present invention will be described in detail with reference to the accompanying drawings. It should be understood that the preferred embodiment of the present invention only is illustrative and not intended to limit the protection scope of the present invention.

Figure 1:
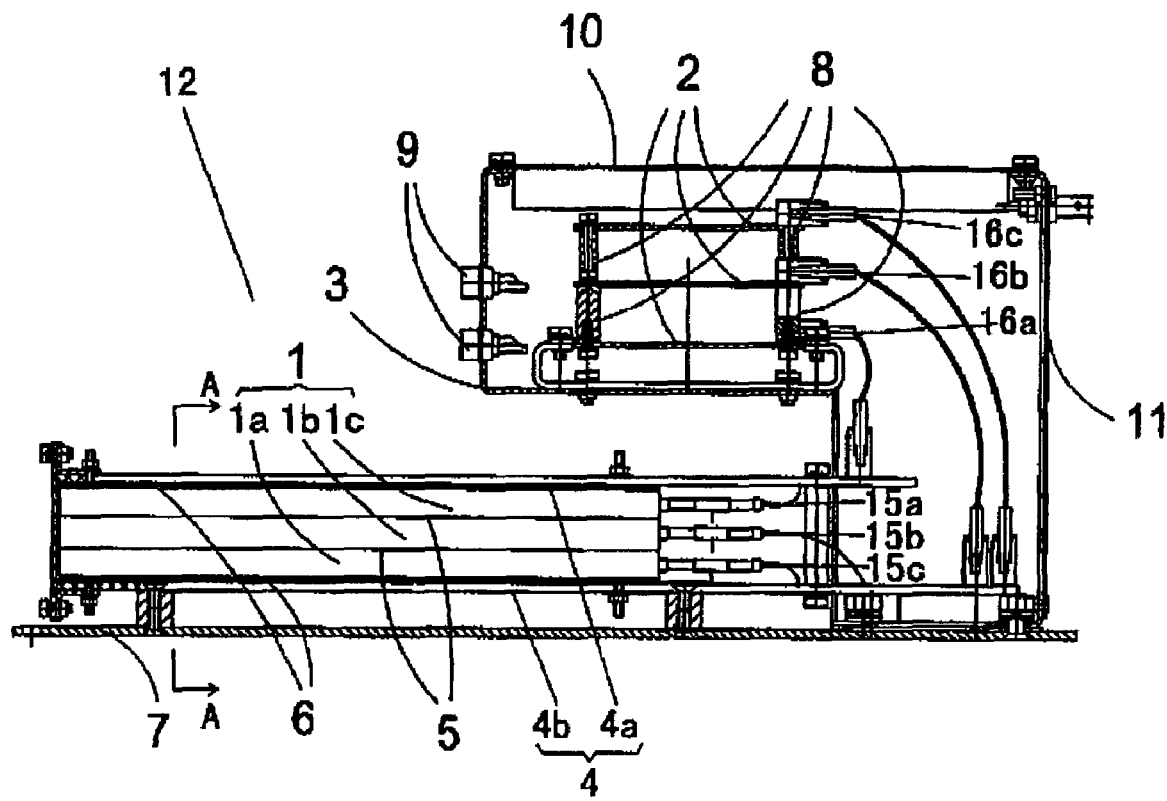
FIG. 1 shows a sectional structural view of the multi-array detector module structure according to the present invention.
Figure 2:
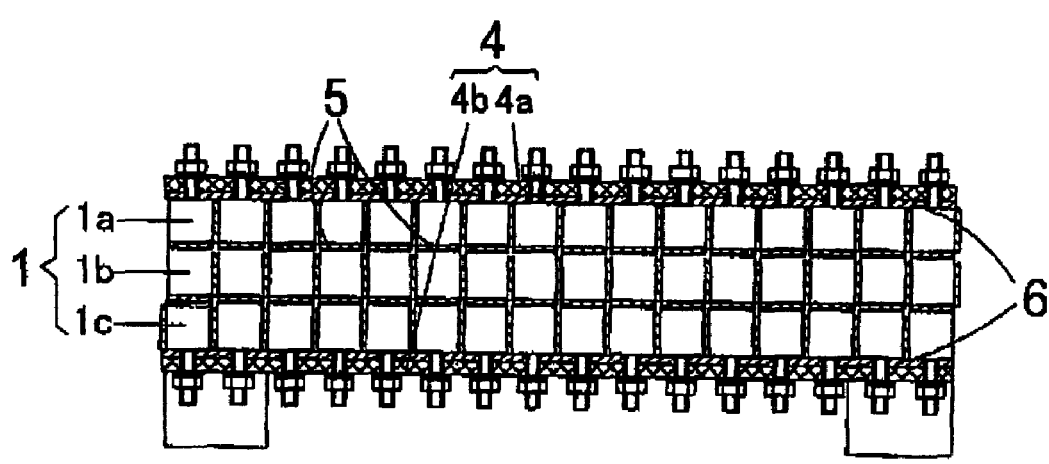
FIG. 2 shows a sectional view taken along a A-A direction shown in FIG. 1.

Referring to FIGS. 1 and 2, the multi-array detector module structure of the present invention comprises a casing 3, a bottom plate 7, and a multi-array detector 1. As shown in FIG. 1, the casing 3 has a ⊔shape. A bottom end of the casing 3 is fixed to the bottom plate 7. Inside of the casing 3, a bracket 8 is provided for fixing three circuit boards 2, and on the front end face (the upper left end shown in FIG. 1) of the casing 3, a plurality of sockets 9 are provided to connect with output terminals of the three circuit boards 2, respectively. The casing 3 is provided on the upper end face and the rear end face thereof (the right end shown in FIG. 1) with an upper covering plate 10 and a rear covering plate 11, respectively, which have shapes matching the upper end face and the rear end face, respectively, so as to facilitate mounting/dismounting of components in the casing.

A mounting frame 4 is disposed on the bottom plate 7. The mounting frame 4 comprises an upper plate 4a and a lower plate 4b. The upper plate 4a and the lower plate 4b may be printed circuit boards. However, the upper plate 4a and the lower plate 4b are not limited thereto, and can be any type of suitable plates.

As shown in FIGS. 1 and 2, the multi-array detector 1 comprises two peripheral detector arrays 1a, 1c and a middle detector array 1b. The two peripheral detector arrays 1a, 1c are fixed to the upper plate 4a and the lower plate 4b of the mounting frame 4, respectively. The middle detector array 1b adjoins the two peripheral detector arrays 1a and 1c and is fixed with the same. Heavy metal sheets 5 are provided between respective rows of detector arrays 1a, 1b, and 1c and between respective detectors in the same row of detector arrays, for reducing cross talk. Heavy metal plates 6 are provided between the peripheries of the two peripheral detector arrays 1a, 1c and the upper plate 4a and the lower plate 4b of the mounting frame 4, respectively, for reducing diffusion. The heavy metal sheets 5 and the heavy metal plates 6 can be made of the same heavy metal material, and alternatively, they can be made of different heavy metal material. In a preferred embodiment, the heavy metal is lead. Signal output terminals 15a, 15b, 15c of the respective detector arrays 1a, 1b, 1c are connected with signal input terminals 16a, 16b, 16c of the respective circuit boards 2, respectively.

The detector employs a gas detector or a solid detector. Although the detector module according to the above embodiment includes three rows of detector arrays, any suitable number of detector arrays can be employed, for example more than three rows of detector arrays, which also falls within the protection scope of the present invention.

Figure 3:
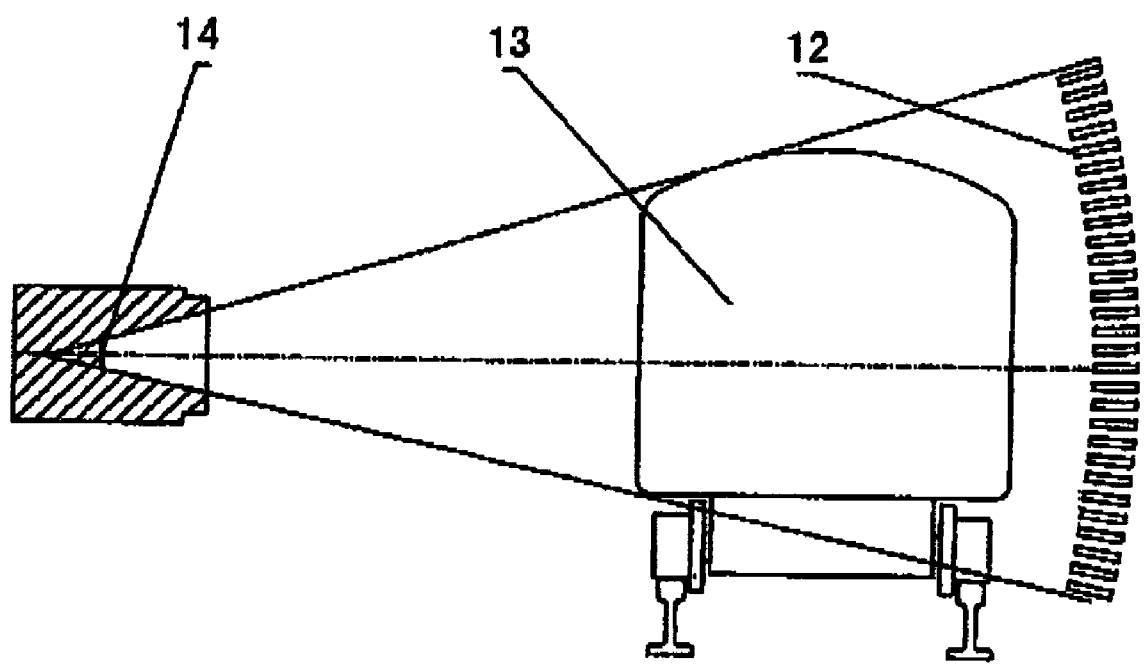
FIG. 3 is schematic view of a radiation image system in which the multi-array detector module structure of the present invention is used.

Referring to FIG. 3, in a radiation image system in which the multi-array detector module structure of the present invention is applied, a plurality of multi-array detector module structures 12 are arranged into a sector shape or a L shape, so that the angle formed between each of the respective detectors and each of the pulse X-rays emitted by the accelerator 14 is zero degree. When X-ray beam pass through the object 13 to be detected, X-rays transmitted through the object 13 to be detected reach the respective multi-array detector module structures 12. According to change in intensity of X-rays passing through the object 13 to be detected, thickness, density, and material characteristic of the object contained in a box can be reflected, and then intensity of X-rays is converted into image gradations, so that a perspective image of the object 13 to be detected can be obtained.

Alternatively, the multi-array detector module structure of the present invention can be applied to a radiation imaging system in which isotope is used as a radiation source.

Although a preferred embodiment of the present invention has been illustrated and described, it will be appreciated by those skilled in the art that changes may be made in forms and details without departing from the spirit and scope of the present invention, the scope of which is defined in the appended claims and their equivalents.

What is claimed is:

1. A multi-array detector module structure for radiation imaging, comprising:
    a casing (3);
    a bottom plate (7) to which a bottom end of the casing (3) is fixedly connected;
    a mounting frame (4) disposed on said bottom plate (7), said mounting frame (4) including an upper plate (4a) and a lower plate (4b);
    a multi-array detector (1) comprising:
        two rows of peripheral detector arrays (1a, 1c) fixed to the upper plate (4a) and the lower plate (4b) of said mounting frame (4), respectively;
        at least one row of a middle detector array (1b) disposed between said two rows of peripheral detector arrays and fixed to the upper plate and the lower plate of said mounting frame,
        wherein each detector array comprises a plurality of detectors; and
    heavy metal sheets (5) provided between respective detector arrays in respective rows of the multi-array detector (1) for reducing cross talk.

2. The multi-array detector module structure for radiation imaging according to claim 1, characterized in that:
    heavy metal plates (6) are provided between said two rows of peripheral detector arrays (1a, 1c) and the upper plate (4a) and the lower plate (4b) of said mounting frame (4), respectively, for reducing diffusion.

3. The multi-array detector module structure for radiation imaging according to claim 2, characterized in that:
    said heavy metal plate (6) is made of lead metal.

4. The multi-array detector module structure for radiation imaging according to claim 1, characterized in that:
    a bracket (8) is provided inside of said casing,
    a plurality of circuit boards (2) are fixed to the bracket (8), wherein input terminals (16*a*, 16*b*, 16*c*) of said plurality of circuit boards (2) are connected with output terminals of said plurality of detector arrays (1*a*, 1*b*, 1*c*), respectively.

5. The multi-array detector module structure for radiation imaging according to claim 4, characterized in that:
said casing (3) is provided on an end face thereof with a plurality of sockets (9) connected with output terminals of the plurality of circuit boards (2), respectively.

6. The multi-array detector module structure for radiation imaging according to claim 5, characterized in that:
said casing (3) has an inverse L shape.

7. The multi-array detector module structure for radiation imaging according to claim 6, characterized in that:
said upper plate (4*a*) and said lower plate (4*b*) are printed circuit boards.

8. The multi-array detector module structure for radiation imaging according to claim 1, characterized in that:
said at least one row of middle detector array includes one row of middle detector array.

9. The multi-array detector module structure for radiation imaging according to claim 1, characterized in that:
said at least one row of middle detector array includes two rows of or more than two rows of middle detector arrays.

10. The multi-array detector module structure for radiation imaging according to claim 1, characterized in that:
said casing (3) is provided on at least one end face thereof with a detachable covering plate (10, 11).

11. The multi-array detector module structure for radiation imaging according to claim 1 or claim 2, characterized in that:
said detector employs a gas detector or a solid detector.

12. The multi-array detector module structure for radiation imaging according to any one of claims 8-9, characterized in that:
heavy metal plates (6) are provided between said two rows of peripheral detector arrays (1*a*, 1*c*) and the upper plate (4*a*) and the lower plate (4*b*) of said mounting frame (4), respectively, for reducing diffusion.

13. The multi-array detector module structure for radiation imaging according to any one of claims 8-9, characterized in that:
a bracket (8) is provided inside of said casing,
a plurality of circuit boards (2) are fixed to the bracket (8),
wherein input terminals (16*a*, 16*b*, 16*c*) of said plurality of circuit boards (2) are connected with output terminals of said plurality of detector arrays (1*a*, 1*b*, 1*c*), respectively.

14. The multi-array detector module structure for radiation imaging according to any one of claims 8-9, characterized in that:
said casing (3) is provided on an end face thereof with a plurality of sockets (9) connected with output terminals of the plurality of circuit boards (2), respectively.

15. A radiation imaging system, comprising:
a radiation source (14) disposed on a side of an object to be detected,
a detector device disposed on an opposite side of the object to be detected to said radiation source (14), and said detector device comprises a plurality of multi-array detector module structures for radiation imaging according to claim 1.

16. The radiation imaging system according to claim 15, characterized in that:
said plurality of multi-array detector module structures are arranged into a sector shape or a L shape.

17. The radiation imaging system according to claim 16, characterized in that:
said radiation source (14) is a X-ray radiation source or an isotope radiation source.

\* \* \* \* \*